July 14, 1970  F. P. ELLZEY  3,520,272
ANGLE DRIVE BOAT PROPULSION UNIT WITH SHAFT SUPPORTED
PROPELLER ASSEMBLY
Filed May 13, 1968  3 Sheets-Sheet 1
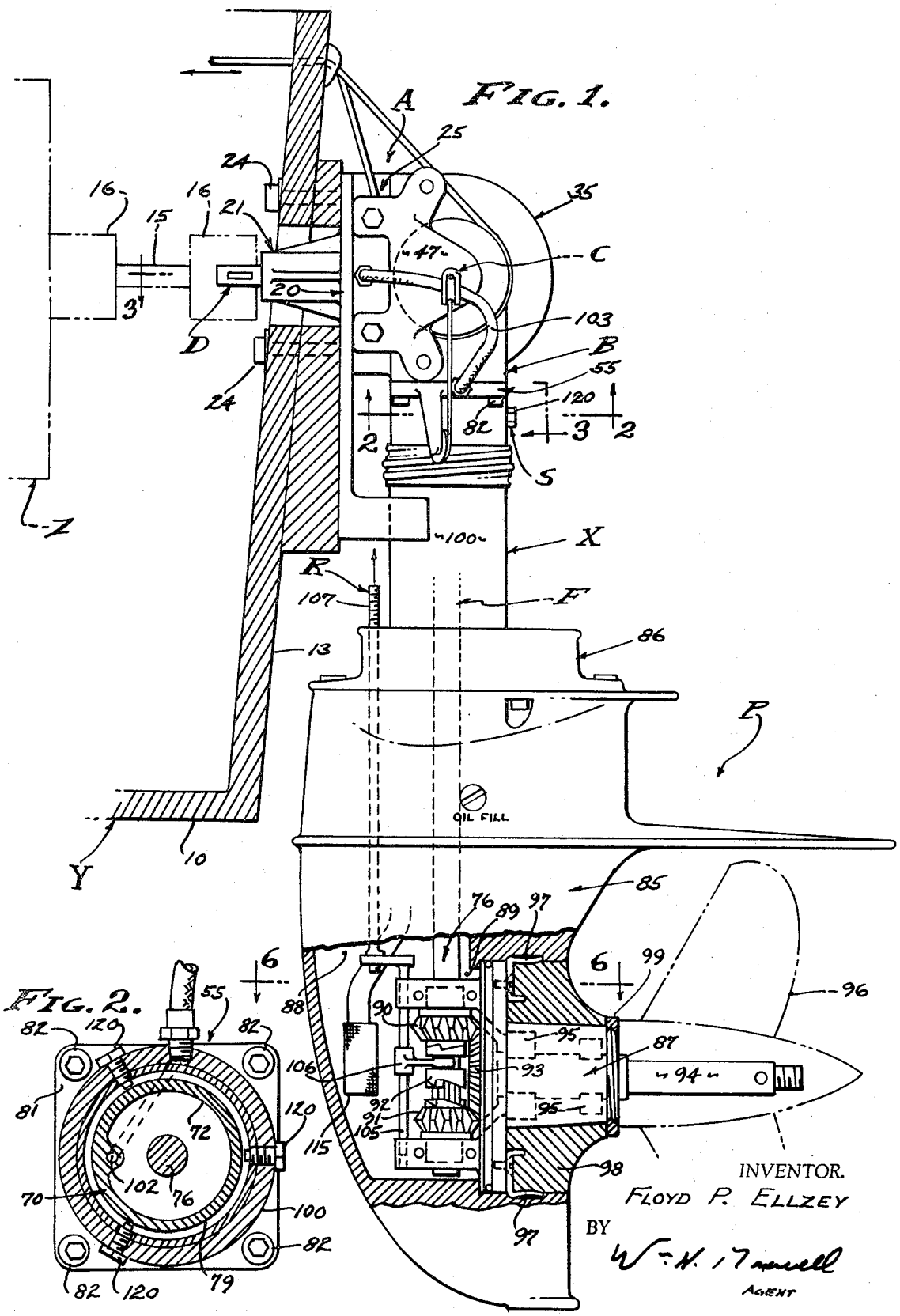
INVENTOR.
FLOYD P. ELLZEY
BY
W. H. Trowell
AGENT July 14, 1970  F. P. ELLZEY  3,520,272
ANGLE DRIVE BOAT PROPULSION UNIT WITH SHAFT SUPPORTED
PROPELLER ASSEMBLY
Filed May 13, 1968  3 Sheets-Sheet 2
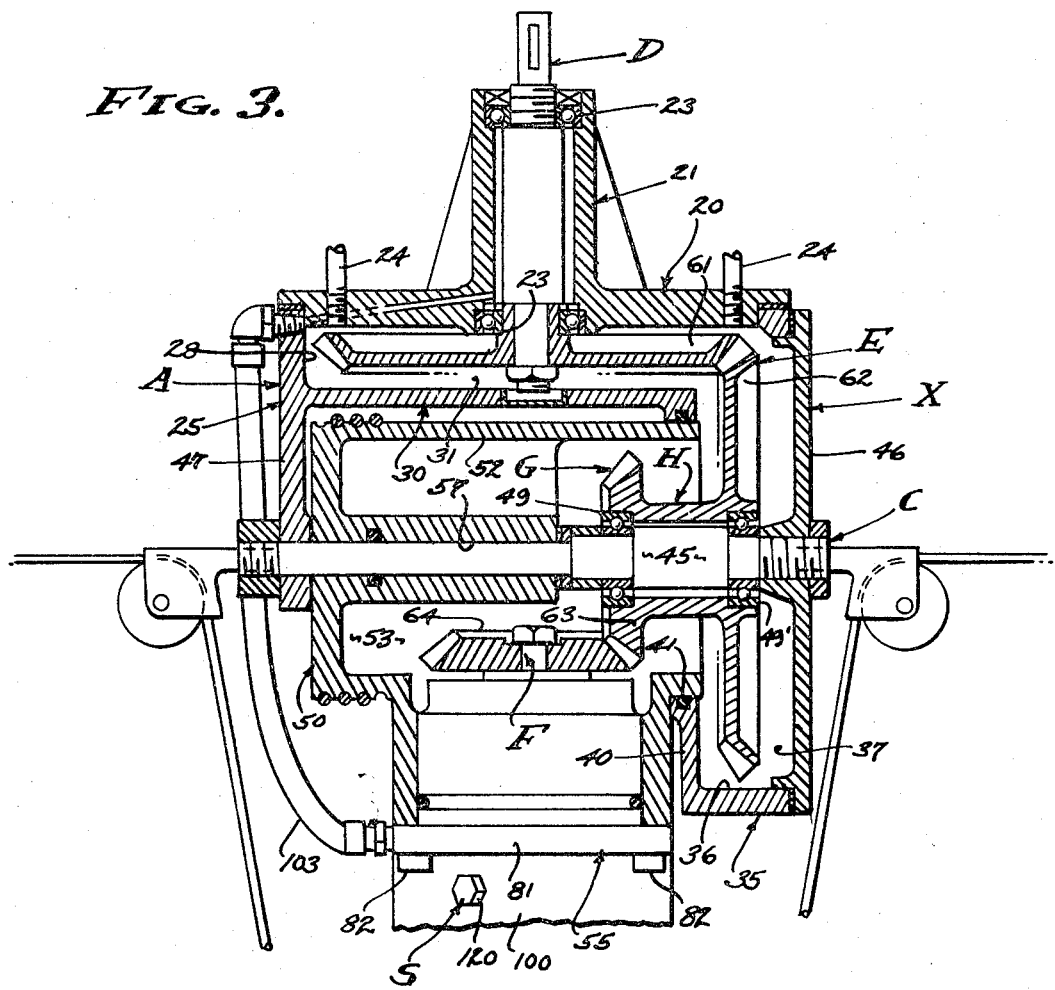
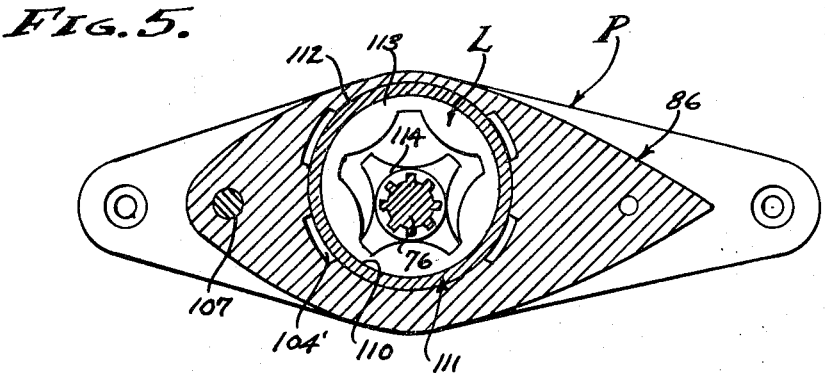
INVENTOR.
FLOYD P. ELLZEY
BY
AGENT

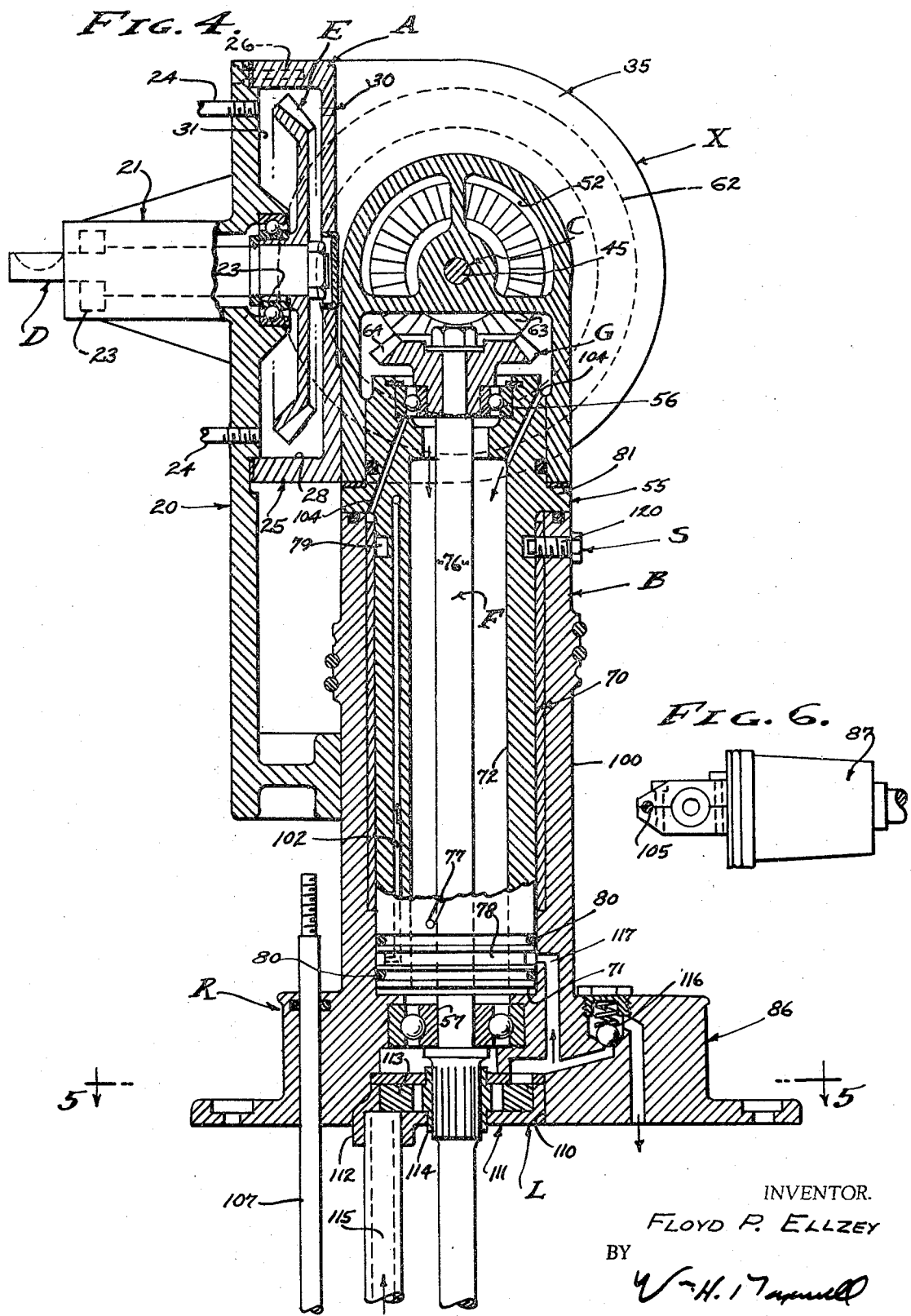

United States Patent Office 3,520,272
Patented July 14, 1970

3,520,272
ANGLE DRIVE BOAT PROPULSION UNIT WITH
SHAFT SUPPORTED PROPELLER ASSEMBLY
Floyd P. Ellzey, 2301 Marshallfield Lane,
Redondo Beach, Calif. 90278
Filed May 13, 1968, Ser. No. 728,383
Int. Cl. B63h 5/06, 25/42
U.S. Cl. 115—35                                      4 Claims

ABSTRACT OF THE DISCLOSURE

A safety device in an inboard-outboard drive for boats wherein the propeller assembly is steerable and normally supported solely by a vertically disposed driving shaft depending from an adaptor housing, there being a carrier that supports the propeller assembly from the driving shaft and that rotatably surrounds the said adaptor, provision being made in the form of securement means to hold this assembled relationship intact in the event that the driving shaft fails and/or separates and normally operating free and clear between the adaptor and carrier, and all of which ensures complete safety against accidental disassembly.

---

This application is copending with application Ser. No. 477,764, filed Aug. 6, 1965, entitled Boat Propulsion Unit and Propeller Assembly and issued Feb. 18, 1969 as Letters Patent No. 3,428,018.

An object of this invention is to provide a practical, reliable and relatively simple and inexpensive boat propulsion gearing unit and propeller assembly combination. The propulsion unit and propeller assembly combination, as herein described, has all of the advantages of both inboard and outboard installations without sacrificing any of the desirable features of either of said two distinct types of installations.

This invention involves a steerable propeller assembly attached to an articulated angle drive unit and which includes a pressure lubrication means that supplies lubricant to the uppermost right angle articulated drive gearing, and which involves heat transfer and recirculation of the lubricant through the lowermost right angle and steerable and reversible propeller drive gearing. Disassembly is a problem with drives of the type under consideration in that proper adjustment of intermeshed gears must be maintained and the individual mechanisms of the device should be independently serviceable if at all possible. To this end, therefore, a combination of elements is constructed according to my issued Letters Patent of the United States No. 3,094,097 dated June 18, 1963 and which involves an adaptor and a carrier which are co-operatively related with respect to the upper and lower right angle gear assemblies, so as to permit selective assembly and disassembly of the entire lower propeller unit or a portion thereof and with or without disturbing the attachment thereof to the upper right angle and articulated drive gearing, all as circumstances require.

The major problem with drives of the type under consideration is the consequences of a broken drive shaft, the shaft that normally extends vertically from the right angle articulated drive gearing to the right angle and steerable and reversible propeller assembly gearing. It is possible to revolvably interconnect the relatively rotatable housings of the upper and lower sections of such units, but in many instances the said vertical drive shaft is relied upon to suspend the lower unit from the upper unit. This drive shaft suspension feature has its advantages, but with its use there is the risk of dropping the lower section in the event that the drive shaft is broken. Therefore, it is an object of this invention to provide securement means for the positive retainment of the lower right angle and reversible propeller assembly gearing to the normally stationary (articulatable) upper right angle gearing of a boat propulsion unit, in a construction wherein the drive shaft is substantially vertical and is normally employed to suspend the said steerable section from the stationary section.

The various objects and features of this invention will be fully understood from the following detailed description of the typical preferred form and application thereof, throughout which description reference is made to the accompanying drawings, in which:

FIG. 1 is a side elevation and partially sectional view of a typical embodiment of the boat propulsion unit and propeller assembly that I provide showing the combination in an operating position.

FIG. 2 is an enlarged section taken as indicated by line 2—2 on FIG. 1.

FIG. 3 is an enlarged sectional view taken substantially as indicated by line 3—3 on FIG. 1.

FIG. 4 is an enlarged detailed sectional view of the upper portion of the structure shown in FIG. 1 and taken through the central plane thereof.

FIG. 5 is a detailed sectional view taken as indicated by line 5—5 on FIG. 4, and FIG. 6 is a plan section of a portion of the structure and taken as indicated by line 6—6 on FIG. 1.

The handling and manipulation of boats is accompanied by the problem of making landings, or coming ashore, and by the process of hauling the boat out of water and onto shore. Further, there is always the danger of running aground. When power boats are involved, the above mentioned situations are of great importance since a power boat must have an underwater propeller assembly carried beneath the hull. For this reason, boats having inboard power plants with fixed propeller assemblies must be handled carefully so as to avoid damage to said assembly, and as a general rule cannot be beached or hauled ashore without special gear. On the other hand, boats having outboard power plants with shiftable, or removable, propeller assemblies are much more easily handled, and can be run aground or ashore without adverse effect on the propeller assembly and/or power plant connected therewith. However, the latter type propulsion unit is limited in size and power and becomes rather bulky and difficult to handle when made of any appreciable size and power since the power plant is made integral therewith. Therefore, it has been found to be advantageous to employ a permanently installed power plant within the boat and to devise a separate and articulated propeller assembly geared thereto. Further, and as pointed out above, the right angularly related shafting of the drive requires the provision of gearing, and this necessitates lubrication for the transmission of power. Such a drive involves a propeller on an axis spaced from and parallel to the engine axis, with a drive shaft extended at a normal angle between the two said axes. Customarily, there is a closed gear chamber at each end, upper and lower, of the drive shaft and each containing lubricant for the gearing involved at that location. However, with the present invention these two chambers are open one into the other for the recirculation of lubricant therethrough, there being pressure lubricating means to draw lubricant from the lowermost chamber and to deliver the lubricant effectively into the uppermost chamber.

In view of the foregoing problem and objects I have provided a combined propulsion unit X for use on or in connection with a boat or vessel Y to be powered by a power plant Z. The boat Y may vary widely and involves a hull 10 with a flat vertically disposed transom 13, it being understood that the back or stern of the boat, as formed by the transom 13, may be varied as particular circumstances require. The power plant Z may be any suitable prime mover adapted to apply torque to a shaft for rotating the same, and, for example, it may be an internal combustion engine carried in the hull 10 on a horizontally disposed axis, centrally of the hull, and connected directly to the combined propulsion unit X by a shaft 15, through universal joints 16 provided at the opposite ends of the shaft 15 to connect it to the power plant Z and to the unit X.

The combined propulsion unit X involves, generally, a frame A, an arm B, means C pivotally joining the arm B to the frame A, an input or drive shaft D and a pair of drive gears E, an output or driven shaft F and a pair of driven gears G, an intermediate shaft H, and a propeller assembly P, all as hereinafter described. The frame A is adapted to be attached to the hull of the boat in fixed relationship thereto while the arm B is mounted by the means C to swing on a horizontal axis extending transverse or abeam of the hull 10. The drive shaft D is carried by the frame A on a longitudinally disposed or fore-and-aft axis while the driven shaft F is carried by the arm B on an articulated axis. The intermediate shaft H operates between the shafts D and F and is carried by the means C through the frame A on said horizontal transverse axis of said means. The pairs of gears E and G operate on the shafts D, F and H, as hereinafter described.

The frame A provided for attachment to the hull 10, preferably at the transom 13, and for supporting the other elements of the structure is a rigid part, preferably a casting or the like, that journals the drive shaft D and houses the drive gears E. When the transom 13 is vertically disposed, as in the case illustrated, the frame A involves a vertically disposed mounting plate 20 and a housing 25 carried by the plate. That is, the frame A is sectional, the plate 20 and housing 25 thereof being adjustably related to each other. The plate 20 rotatably supports the drive shaft D on its longitudinally disposed axis, as shown, and has therefore a forwardly projecting extension 21 carrying spaced anti-friction bearings 23. The plate 20 is secured to the transom 13 as by a series of circumferentially spaced bolt type fasteners 24 and the housing 25 is secured to the plate 20 as by a series of circumferentially spaced bolt type fasteners 26. The plate and housing are of substantial diameter, there being cooperatively related centering elements formed concentric with the axis of the bearings 23.

The housing 25 rotatably supports the intermediate shaft H and supports the arm B, all through the means C, later described. As shown, the housing 25 involves a central body 30 and a rearwardly projecting support 35. The body 30 has a bore 28 entering therein to form a chamber 31, said chamber being a closed chamber. The support 35 is at a right angle to the body 30 (as shown), and a bore 36 enters therein to form a chamber 37. In accordance with the invention, the support 35 is laterally offset from the longitudinal axis of the plate 20 and its bore 36 enters the outer side of the support, the inner side of the support 35 being closed by a wall 40 so that the chamber 37 is a closed chamber. In accordance with the invention, the wall 40 has a bore 41 extending therethrough on the transverse axis of the means C, later described, and to the end that the chamber 37 opens toward the central portion of the structure rearward of the housing 25.

The means C for pivotally joining the arm B to the frame A is carried by the frame A and rotatably or pivotally supports the arm B to swing in a plane coincidental with the longitudinally extending axis or the bearings 23 and drive shaft D. As best illustrated in FIG. 4 of the drawings, the means C involves a supporting spindle 45 that extends horizontally and transversely of the structure on an axis intersecting the axis of the plate 20 at a right angle. The spindle 45 may be supported or held at either one or at both ends and is preferably supported at both ends, as shown. However, the particular mounting means C shown cantilevers the spindle 45 from one end by a cover 46 and there is also a bearing support bracket 47 at the other end. The cover 46 is a disc-shaped element centered in the bore 36, and the spindle 45 is an elongate part threadedly engaged in and shouldered against the inside of the cover 46. Further, the spindle carries spaced anti-friction bearings 49 and 49′ to carry the intermediate shaft H, as later described.

The arm B is provided to carry the propeller assembly P and is an elongate element rotatably supported on the spindle 45. The arm B has an inner housing portion 50 at the central portion of the structure and it has a removable propeller assembly adaptor 55 projecting radially of the axis of the means C and spindle 45. The arm B rotatably supports the driven shaft F on a bearing 56 or an axis normal to the axis of the spindle 45, ad coincidental with the axis of the bearings 23 when the arm B is horizontally disposed, to the end that the arm swings in a vertically disposed plane extending through the axis of the bearings 23. The housing portion 50 of the arm B has a bore 51 rotatably engaged with the spindle 45 and has a counterbore 52 entering one side thereof to form a closed chamber 53. An O-ring type seal, or the like, is engaged within the bore 51 in order to engage the spindle 45 and close the chamber 53. As shown, the housing portion 50 is turned to slideably enter the bore 41 and has sealing engagement with an O-ring type seal as its rotates therein to close the chambers.

The uppermost angle drive of the propulsion unit is characterized by the relationship of the chambers 31, 37 and 53 and by the relationship of shafts D, F and H, as hereinabove described, and is further characterized by the particular relationship of the two pairs of gears E and G. As best illustrated in FIG. 4 of the drawings, the chambers 31 and 37 combine to establish an L-shaped portion of a compartment, while the chamber 53 is in open communication with chamber 37 and extends parallel with the chamber 31. The drive gears E operate in the compartment established by the chambers 31 and 37, while the driven gears G operate in the portion of the compartment established by the chamber 53. Thus, it will be readily apparent that the pairs of gears E and G are enclosed.

The pair of drive gears E is provided to transmit torque to the intermediate shaft H. The two gears 61 and 62 that are involved are right angle gears, or bevel or mitre gears, the gear 61 being carried in the chamber 31 by the shaft D to rotate on the bearings 23, the gear 62 being carried in the chamber 37 by the shaft H to rotate on the bearings 49 and 49′.

The pair of driven gears G are provided to receive torque from the intermediate shaft H and to deliver said torque to the driven shaft F. The two gears 63 and 64 that are involved are right angle gears, or bevel or mitre gears, the gear 63 being carried in the chamber 53 by the shaft F to rotate on the bearings 56 and 57.

In order to adjust the gears 61 through 64 it is a simple matter to employ suitable shims so that proper positioning of the gears is obtained on their two angularly related axes. With the shims that I have shown the pairs of gears E and G can be adjusted related separately of each other and to the end that said gear sets are properly matched and meshed for most efficient operation.

In carrying out the invention the propeller assembly P is rotatable so that it can be turned in a manner to steer and direct the forward motion of the boat. As clearly shown, there is a rigid and depending element 70 provided to carry the propeller assembly P so that it is steerable, the element 70 being extended from the adaptor 55 of arm B so as to present a smooth cylindrical bearing surface. The element 70 is disposed on a central axis and positions a bearing 56 that journals the upper end portion of a driving shaft 76 disposed concentric with the said axis to project substantially below the terminal bottom end 71 of said element. Therefore, the element 70 has a central bore 72 extending therethrough for the passage of the shaft 76 and it has an external oil groove 77 for lubrication of the element 70 within the bearing sleeve of the propeller assembly P, to be described. There are two features of the present invention which characterize the element 70, firstly the lubricant connecting channel 78 in the form of an annulus at the lower end portion of the element, and secondly the securement channel 79 at the upper end portion of the element. The lubricant collecting channel 78 is cut into the cylindrical exterior of the element 70 so as to open radially outward and is bordered by a pair of O-ring seals 80. The securement channel 79 is also cut into the exterior of the element 70 so as to present an upwardly faced shoulder, as shown.

A third and characteristic feature of the element 70, which is the primary part of the adaptor 55, is the face or mounting flange 81 and its closely related circle of bolt fasteners 82, that establishes the primary point of joinder between the upper and lower units of the structure. It will be apparent how the bearing 56 is supportably seated and retained in the upper end of the element 70, with the gear 64 fastened to the driving shaft 76 and supported by the bearing 56. Therefore, shims are readily installed between the housing portion 50 and the mounting flange 81 in order to set the working clearance between the mitre or bevel gears 63–64. The close relationship of the fasteners 82 to the exterior of the adaptor 55 is best illustrated in FIG. 2.

This invention provides the self-contained steerable propeller assembly P which includes a pressure lubrication means L in addition to the shifting means R. The propeller assembly P can vary in design and involves, generally, a body casing 85, a carrier 86, and a propeller journal 87. The body casing 85 is a rudder-shaped housing of hollow form, open at the top and also at the rear thereof. The top opening 88 is a narrow horizontal opening and of substantial length, while the rear opening 89 is a narrow vertical oval-shaped opening disposed on a transverse plane closely to the axis of shaft 76. The said opening 88 is adapted to engage and be closed by the carrier 86 to which it is secured by fasteners as shown, and the opening 89 is adapted to engage and be closed by the propeller journal 87 to which it is secured by fasteners as shown. The nature of the propeller assembly P requires that the carrier 86 be released from the body 85 before release of the propeller journal 87, as it is necessary to first withdraw the shaft 76 from the body 85, as will become apparent. Thus it is permissible to remove the body 85 and propeller journal 87 without removal of the adaptor 55 and its appurtenances, as circumstances require.

The propeller journal 87 joins with the body casing 85 at the shaft 76 where the greatest cross-section is required by the drive gears 90 and 91. In carrying out the invention, the gears 90 and 91 are journaled in forwardly disposed extensions of the propeller journal 87, extensions in the form of spaced ears, and on the axis concentric with the driving shaft 76. As a result, the lower end portion of the shaft 76 extends through the gears 90 and 91 to be centered therein by pilot bearings carried in said gears respectively. Intermediate the gears 90 and 91 there is a shiftable dog clutch 92 splined to move along the shaft 76 and adapted to alternately engage the gears 90 and 91. The gears 90 and 91 are bevel gears that are continuously engaged with a right angle related drive gear 93 on the foremost end of a propeller shaft 94. The shaft 94 is rotatable in bearings 95 housed within the journal 87, there being a seal from which the propeller shaft 94 projects rearwardly to driveably carry a propeller 96.

The forwardly disposed ear-like extensions which journal the gears 90 and 91 are also provided to guide a shifting rod 105 that carries a fork 106 to move the dog clutch 92. To this end the said extensions are split and have pillow blocks that retain the bearings that carry the gears 90 and 91 and that also capture the shifting rod 105 to slide on an axis parallel to the shaft 76. In accordance with the invention the journal 87 with its shaft 94 and gears 90 and 91 form a unit of assembly complete with the shifting mechanism which involves the rod 105 and fork 106 engaged with the dog clutch 92. This propeller journal assembly is removable from the body casing 85 when the shaft 76 is withdrawn therefrom. Therefore, the said body casing 85 is removable from the carrier 86, and the shifting rod 105 is adapted to be coupled and/or uncoupled from a control rod 107 that extends through the body 85 and projects from the carrier 86. As shown, there is a lateral extension or tongue on the upper end of rod 105 and into which the lower end of the control rod 107 is threadable. The control rod 107 is reciprocable in the body 85 to be controlled remotely by means of a usual push-pull cable or like control (not shown).

The propeller journal 87 is somewhat smaller in cross-sectional configuration than the casing 85 to which it is matched, and it fits into a shallow recess in the casing 85. A seal encompasses the journal 87 to engage with the casing 85 at said recess, to present a liquid tight joinder. The fastening of parts 87 and 85 is effected by angle clips 97 that involve a stiffly sprung leg stopped by an abutment on the part 85 and a leg normal to the first leg and which can be driven into place and thereby move the first leg as a lever, whereupon a small fastener holds the second leg of the clip in place against the part 87. With the parts assembled as described a fairing 98 is fastened in place to extend rearwardly from the body casing 85 to the propeller 96. This fairing 98 is advantageously formed of solid zinc or the like, for the control of electrolytical action which would otherwise act adversely upon the drive. The fairing 98 is secured in place by a ring nut 99 threaded onto the journal 87.

In accordance with this invention the carrier 86 is cooperatively related to both the uppermost right angle articulated drive gearing and the lowermost right angle and steerable propeller assembly and reversible drive gearing. The carrier 86 is an essential part of the said lowermost assembly P and affords the steerable connection to the adaptor 55, affords the accommodation of essential parts of the lubrication means L, and affords the effective installation of a securement means S, all to be hereinafter described. The carrier 86 overlies the body casing 85, being fastened thereto to close the opening 89, and it is characterized by its vertically disposed tubular extension 100 that is adapted to slideably and rotatably receive the cylindrical element 70 with the driving shaft 76 projecting downwardly to enter through the bearings 90 and 91. In practice, the interior of the extension 100 has a bearing liner that rotatably engages the cylindrical exterior of the element 70 and which is lubricated by means of the groove 77.

The lower portion of the extension 100 is bored to rotatably engage with the seals 80 that embrace the lubricant channel 78, and there is a passage 102 that extends from the channel 78 and through the element 70 to open into the L-shaped compartment and parallel extension thereof established by the chambers 31, 37 and 53. In practice, the chamber 31 is remote from the upper discharge end of the passage 102, in which case a hose 103 extends directly from the passage 102 to the chamber 31. As shown, there is an elbow fitting entering into chamber 31 at the side thereof, and there is a swivel elbow fitting or the like on the flange of adaptor 55, with the hose extending flexibly therebetween to discharge toward the upper gearing. The lubricant that discharges from the passage 102 rises in the chambers 31, 37 and 53, and drains therefrom through the bearing 56 and through ports 104 to flow downwardly along the shaft 76 toward the closed body casing 85 which provides a collecting sump. The lubricant can be filled to the "oil fill" hole shown in FIG. 1.

The carrier 86 is related to the driving shaft 76 to be carried by the bearing 56 above described and the depending shaft 76 that supportably carries a lower intermediate shaft bearing 57. The bearing 57 is seated upwardly into the carrier 86 and is held in position by an upwardly faced shoulder on said shaft, thereby having supporting engagement with the lower propeller assembly P. The recirculation of lubricant downwardly through the carrier bore passes over or through the bearing 57, there being ports 104' to accommodate said lubricant flow. The bearing 57 serves to steady the shaft 76 and to center the shaft for its operation through the pressure lubricating pump to be described.

The carrier 86 as it is related to the lubrication means L involves a recess 110 into which a "Geroter" pump 111 is installed over the shaft 76. As is illustrated, the pump 111 comprises a body or case 112 of circular formation and which is installed eccentrically in relation to the shaft 76. The pump 111 involves two revolving elements of gear formation, an internal form element 113 that revolves concentrically within the case 112, and an external form element 114 that revolves concentrically with the shaft 76. There is splined engagement between the shaft 76 and the centered element 114. Thus, the element 114 is driven by the shaft 76 and has one less tooth form than the element 113, there being oppositely positioned inlet and outlet ports in the case 112, as shown, to receive lubricant through a suction tube and strainer 115 disposed in the sump of the propeller assembly, and to deliver lubricant to a pressure by-pass valve 116. The discharge of pump 111 which is not by passed, then passes through communicating passages 117 and to the lubricant collecting channel 78 for pressure lubrication of the gearing.

The carrier 86 as it is related to the securement means S involves a portion thereof which is devoted to the visible accommodation of removable support pins 120. As is shown throughout the drawings, the support pins 120 are dog-pointed fasteners that threadedly engage through the side wall of the carrier 86 to enter the securement channel 79 that presents the upwardly faced shoulder on the adaptor 55. The dog points of the pins 120 are normally free and clear of the channel walls, and function as safety pins that catch the propeller assembly and only upon failure of the shaft 76, or sepaartion thereof, do the pins 120 function and then as a positive lock against separation of the lower propeller assembly P from the upper drive unit.

From the foregoing description it will be clear that there is the combination of an upper articulatable angle drive and a lower reversible angle drive propeller assembly. These upper and lower assemblies are cooperatively joined by means of the adaptor 55 related to the upper drive assembly and by means of the carrier 86 related to the lower drive assembly. It is the adaptor 55 which provides the cylindrical bearing upon which the lower propeller assembly P revolves for steerability, and it is the adaptor 55 which can be removed from its normal operating position on the housing portion 50 in the event that the entire lower propeller assembly P is to be removed. It is the carrier 86 which provides for disassembly of the journal 87 from the body 85 without removal of the entire propeller assembly, by permitting separation of the body 85 from the depending suspension shaft 76 in order to permit withdrawal of the journal 87 rearwardly from its recess in the body 85. In accordance with this invention the propeller assembly, whether fixed or steerable, is supported upon the bearing 57 that is suspended by the shaft 76 that is rotatably carried by bearing 56 supported in the adaptor 55, all as clearly shown in FIG. 4 of the drawings. Further, the carrier 86 provides for accommodation of a direct driven pump 111 with all its required features for intake and delivery of lubricant. The delivery of lubricant is pressure controlled to the uppermost extremity of the gearing, the uppermost gears being supplied with lubricant that is cooled within the sump configuration of the body 85, and all to the end that heat is effectively transferred away from the uppermost gearing of the drive.

Having described only a typical preferred form and application of my invention, I do not wish to be limited or restricted to the specific details herein set forth, but wish to reserve to myself any modifications or variations that may appear to those skilled in the art:

Having described my invention, I claim:

1. Assembly securement means in an angle drive boat propulsion unit having, a frame for attachment to the boat and comprising a housing portion rotatably carrying a bevel gear on a substantially horizontal axis, and means to rotatably drive said bevel gear, an adaptor releasably fixed to the frame and projecting therefrom on an axis angularly related to the axis of the said bevel gear, a driving shaft depending through the adaptor and rotatably supported on a bearing fixed therein and with a bevel gear carried by the driving shaft within the housing of the frame and driveably engaged with said first mentioned bevel gear and said driving shaft projecting from the adaptor, a carrier with an extension rotatably engaged with the projecting adaptor and with a bearing fixed therein and supported solely on the said driving shaft projecting from the adaptor, and a steerable propeller assembly secured to the carrier and comprising a body to receive the projecting driving shaft and a journal rotatably carrying a propeller shaft and angle drive gears, at least one of said gears being driveably engaged by said projecting driving shaft; and including, an upwardly faced shoulder on the adaptor and at least one pin fastened onto the carrier to overlie the shoulder on the adaptor with clearance so as to engage said shoulder in the event that the driving shaft fails to support the carrier and propeller assembly.

2. The assembly securement means in an angle drive unit with the shaft supported carrier and propeller assembly as set forth in claim 1, wherein the adaptor has a bearing extension projecting from the frame on the axis angularly related to the axis of said first mentioned bevel gear and with said upwardly faced shoulder formed in said bearing extension, wherein the carrier has a bearing extension rotatable on said adaptor bearing extension, and wherein said at least one pin is fastened onto the carrier extension to overlie the said shoulder on the adaptor bearing extension with said clearance so as to engage said shoulder in the event that the driving shaft fails to support the carrier and propeller assembly.

3. The assembly securement means in an angle drive unit with the shaft supported carrier and propeller assembly as set forth in claim 1, wherein the adaptor has a cylindrical extension projecting from the frame on the axis angularly related to the axis of said first mentioned bevel gear and with said upwardly faced shoulder formed at the exterior of said extension, wherein the carrier is rotatable on the cylindrical extension of the adaptor and comprises a cylindrical extension slideably engaged over said cylindrical extension of the adaptor, and wherein said at least one pin is fastened through the cylindrical carrier extension to overlie the said upwardly faced shoulder at the exterior of the cylindrical adaptor extension with said clearance so as to engage said shoulder in the event that the driving shaft fails to support the carrier and propeller assembly.

4. The assembly securement means in an angle drive unit with the shaft supported carrier and propeller assembly as set forth in claim 1, wherein the adaptor has a cylindrical extension projecting from the frame and carrying the first mentioned bearing on the axis angularly related to the axis of said first mentioned bevel gear and with said upwardly faced shoulder formed at the exterior of said extension, wherein the driving shaft is rotatably supported on said bearing on the adaptor and projects from the cylindrical extension thereof, wherein the carrier is rotatable on the cylindrical extension of the adaptor and comprises a cylindrical extension slideably engaged over the cylindrical extension of the adaptor and with said second mentioned bearing fixed therein and supported solely on the said driving shaft, and wherein said at least one pin is fastened through the cylindrical carrier extension to overlie the said upwardly faced shoulder at the exterior of the cylindrical adaptor extension with said clearance so as to engage said shoulder in the event that the driving shaft fails to support the carrier and propeller assembly.

References Cited

UNITED STATES PATENTS

| | | | |
|---|---|---|---|
| 268,686 | 12/1882 | Kaiser | 285—404 X |
| 2,114,633 | 4/1938 | Hedges | 115—35 |
| 2,496,434 | 2/1950 | Bosma | 115—37 |
| 3,054,376 | 9/1962 | Schneider | 115—35 |
| 3,428,018 | 2/1969 | Ellzey | 115—35 |

TRYGVE M. BLIX, Primary Examiner